United States Patent [19]

Brankley et al.

[11] Patent Number: 5,692,039
[45] Date of Patent: Nov. 25, 1997

[54] IMPROVED DATA TRANSMISSION VIA A PUBLIC SWITCHED TELEPHONE NETWORK

[75] Inventors: Russell J. Brankley, Willingboro, N.J.; James M. Dorsey, Havertown, Pa.

[73] Assignee: Bell Atlantic Network Services, Inc., Arlington, Va.

[21] Appl. No.: 460,680

[22] Filed: Jun. 2, 1995

Related U.S. Application Data

[63] Continuation of Ser. No. 232,841, Apr. 22, 1994, Pat. No. 5,467,390, which is a continuation of Ser. No. 859,580, Mar. 27, 1992, abandoned.

[51] Int. Cl.$^6$ ............................................. H04M 3/42
[52] U.S. Cl. ............................. 379/229; 379/93; 379/94; 379/210; 379/100
[58] Field of Search ................................. 379/229, 201, 379/100, 233, 243, 251, 258, 20, 93, 94, 210; 370/110.1

[56] References Cited

U.S. PATENT DOCUMENTS

| | | | |
|---|---|---|---|
| 4,958,153 | 9/1990 | Murata et al. | 370/110.1 |
| 5,018,191 | 5/1991 | Catron et al. | 379/100 |
| 5,033,079 | 7/1991 | Catron et al. | 379/100 |
| 5,247,571 | 9/1993 | Kay et al. | 379/207 |

FOREIGN PATENT DOCUMENTS

60-162332  8/1985  Japan ..................................... 379/100

*Primary Examiner*—Ahmad F. Matar
*Attorney, Agent, or Firm*—Lowe, Price, LeBlanc & Becker

[57] ABSTRACT

A Public Switched Telephone Network (PSTN) linking an originating facility and a terminating facility through an originating switch connected to the originating facility and a terminating switch connected to the terminating facility where the terminating facility includes multi-format data terminal devices including a telephone terminal and an additional non-telephone data terminal where the telephone terminal and the non-telephone terminal each have an NPA-NXX-XXXX address, a method including the steps of (a) creating a message at the originating facility, (b) creating an address for the message comprising the NPA-NXX-XXXX address of the telephone station plus an added data characteristic indicative of the non-telephone terminal to which the message is directed, (c) transmitting the address through the originating switch to the terminating switch, (d) analyzing the address at the terminating switch and (e) connecting the message to the data terminal characterized by the added data set.

11 Claims, 6 Drawing Sheets

IMPROVED DATA TRANSMISSION VIA A PUBLIC SWITCHED TELEPHONE NETWORK

This application is a continuation of application Ser. No. 08/232,841 filed Apr. 22, 1994 (now U.S. Pat. No. 5,467,390) which is a continuation of application Ser. No. 07/859,580 filed Mar. 27, 1992 (now abandoned).

TECHNICAL FIELD

The present invention relates to the provision of multi-format data services over the public switched telephone network and more particularly relates to an improved apparatus and methodology for implementing such service in a manner to provide more effective and universal usage of the network.

BACKGROUND ART

The traditional Public Switched Telephone Network (PSTN) operated in the current fashion is encountering increasing difficulties in satisfying emerging communications requirements having diverse characteristics. As a partial result there has been a trend to proliferation of private and semi-commercial networks customized to carry specific types of traffic. While these specialized networks are effective for their limited purposes the result has been the creation of a maze of disparate networks resembling the patchwork system which existed in the early 20th Century before the public networks were interconnected. This proliferation of specialized networks and private solutions serves to make communication more compartmentalized and to duplicate facilities already in existence. This failure to efficiently utilize available infrastructure apparently is due in part to a lack of understanding and appreciation of the current availability and capability of the Advanced Intelligent Network (AIN) in its present stage of development and installation.

In traditional PSTN practice telephony features, such as Call Forwarding, have been based on feature logic and data contained within the Stored Program Control (SPC) Switches in the network. The feature logic is contained within the software programs provided by the switch vendors and the introduction of new features has required new software programs from the switch vendors. Having the feature data contained in the switches has impacted the administration of the data for customers served by several switches and the Telco has been forced to coordinate feature data administration across multiple systems to ensure correct and consistent feature operation.

The concept of the Advanced Intelligent Network (AIN) has been to provide services based on feature logic and data located at a centralized node in the network rather than in each individual switching system node. Appropriately equipped switches in the network, known as Services Switching Points (SSP) communicate with a centralized node, known as a Service Control Point (SCP) database, and together, they provide various AIN services. The Service Management System (SMS) is an operations system used to administer data in the SCP and to provide other operations, administration and maintenance functions for the AIN.

The SSP knows which calls require AIN service based on characteristics of the call, such as the line from which it originated or the digits which were dialed. The process of identifying calls that require AIN processing is known as triggering, since a particular characteristic of the call triggers the switch into providing AIN treatment. Once a trigger occurs a query message is sent to the SCP asking for instructions. Based on information contained in the query message the SCP determines which service is being requested and provides appropriate information such as routing and billing instructions. The SSP then executes this routing and these instructions to complete the call.

Only the SCP knows which service is being performed on a particular call. The SSP simply knows how to identify calls that require AIN processing, and how to execute instructions provided by the SCP. This architecture provides the first stage of realizing AIN capabilities and is predicated on providing SSP capabilities for SPC switches such as the 5ESS and 1AESS and the like switches.

Figure 1:
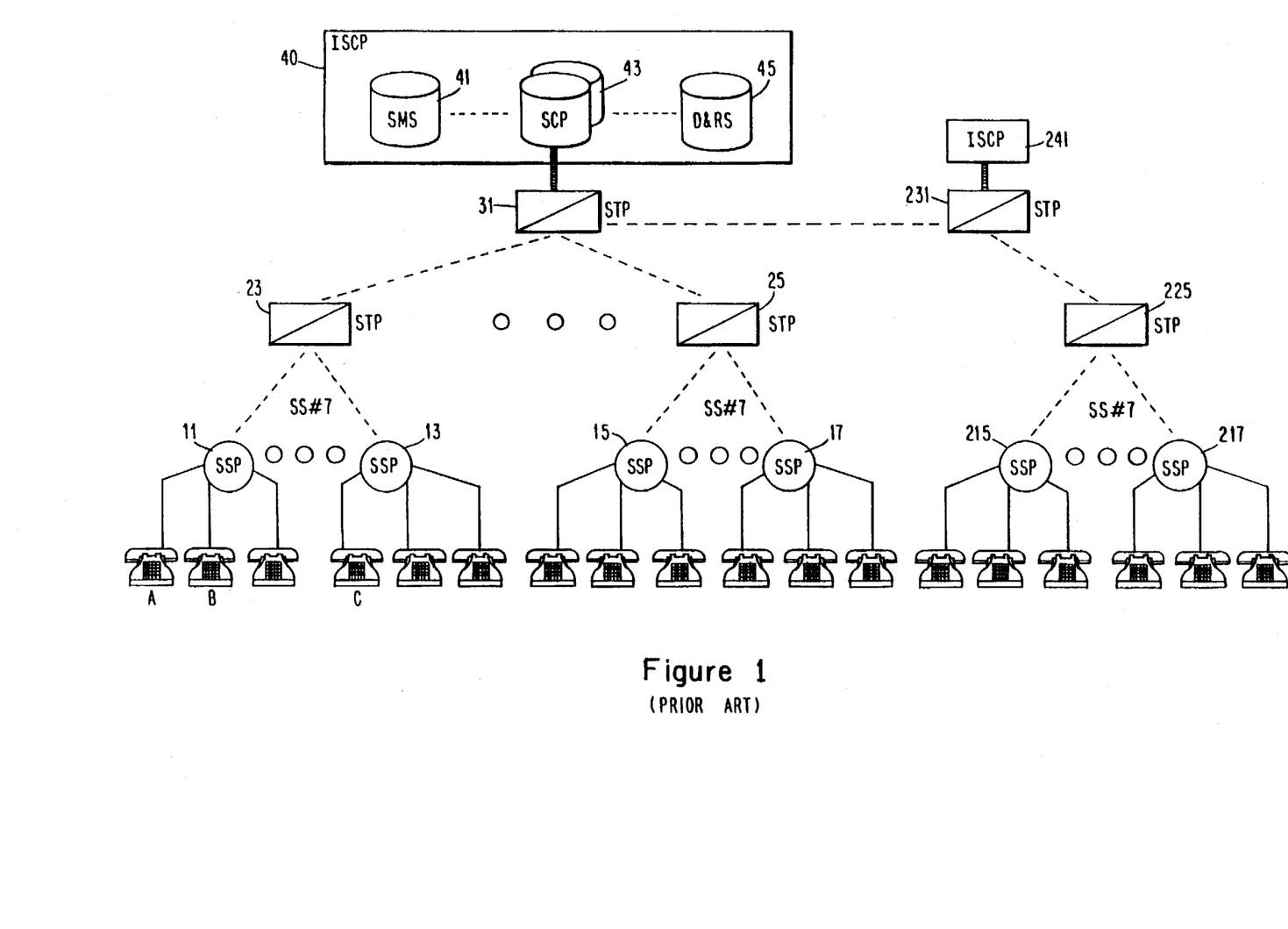
FIG. 1 is a block diagram illustrating an AIN network architecture suitable for carrying out the method of the invention.
Figure 2:
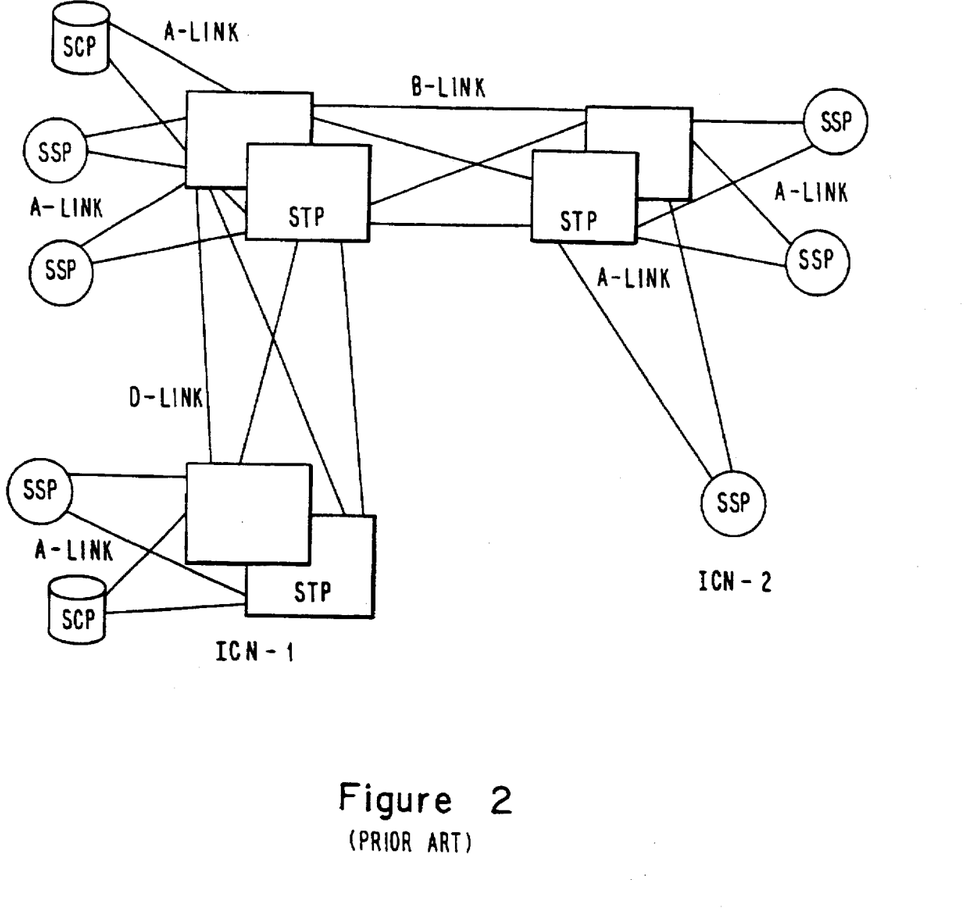
FIG. 2 is a block diagram illustrating a common channel signaling network capable of carrying out the signaling information transfer which may be utilized in the methodology of the invention.

Referring to FIG. 1 there is shown in schematic block diagram form a depiction of the components of the AIN within a region. In this figure the Central Offices (CO) are labeled as SSP 11, 13, 15, 17, 215 and 217. The SSPs 11 and 13 connect to a first local area Signal Transfer Point (STP) 23, and the SSPs 15 and 17 connect to a second local STP 25. The connections to the STPs are for signaling purposes using common channel signaling 7 (CCS7 or SS7). As is understood by those skilled in the art, common channel signaling separates the signaling path from the path used for voice transmission. The Common Channel Signaling Network (CCSN) provides signaling instructions needed by the voice network to set up, route and terminate calls. Specialized databases connected to the CCSN permit the signaling network to transport the specialized routing or terminating instructions which the databases contain. A typical CCSN network is illustrated in FIG. 2.

The SSPs 11 and 13 connect to a first local area STP 23 and the SSPs 15 and 17 connect to a second local area STP 25. As indicated by the black dots below STPs 23 and 25, each local area STP can connect to a large number of the SSPs. Although not shown in FIG. 1 the central offices or SSPs are interconnected to each other by trunk circuits for carrying telephone services.

The local area STPs 23 and 25 and any number of such local area STPs shown as black dots between STPs 23 and 25 communicate with a state or regional STP 31. The state or regional STP 31 in turn provides a communications link with the ISCP 40 (Integrated Service Control Point). The STP hierarchy can be expanded or contracted to as many levels as needed to serve any size area and to service any number of stations and central office switches. The links 23 and 25 between the CO/SSPs and local area STPs are dedicated CCIS links which are typically SS7 type interoffice data communications channels. The local area STPs are in turn connected to each other and to the regional STP 31 via a packet switched network. The regional STP 31 also communicates with ISCP 40 via a packet switched network.

As shown in FIG. 1, the ISCP 40 is an integrated system. Among other system components, the ISCP 40 includes a Service Management System (SMS) 41, a Data and Reporting System (DRS) 45 and the actual database or Service Control Point (SCP) 43. The ISCP also typically includes a terminal sub-system referred to as a Service Creation Environment or SCE 45 for programming the database in the SCP 43 for the services subscribed to by each individual business customer.

Each central office switching system normally responds to a service request on a local communication line connected thereto to selectively connect the requesting line to another selected local communication line. The connection can be made locally through only the connected central office switching system. For example, for a call from station A to station B the SSP/CO 11 provides the call connection without any connection to another central office. When the called line connects to a distant station, for example, when station A calls station C, the connection is made through the connected central office switching system SSP 11 and at least one other central office switching system SSP 13 through the telephone trunks interconnection of the two COs.

The basic operation of the CCSN network is as follows: Based on some characteristic of the call (for example, the line from which the call originated, or the access code that was dialed), the SSP determines that the call requires AIN processing. This process is known as triggering, and it results in the SSP suspending call processing, sending a query message to the SCP and waiting for instructions. The query message is sent to the SCP via a Signaling Transfer Point (STP).

Based on information in the query message, and on the current status of the network, the STP determines which SCP should process the query, and it forwards the query message to that SCP. When the SCP receives the query message it first determines which service is being requested since an SCP typically contains logic and data for many different services and customers. Once this is done, the SCP begins processing the service logic.

The SCP service logic, which is typically constructed directly by the Telco, uses various criteria to determine how to handle the call. Examples of these criteria are the calling number, the dialed number, the day of week, and the time of day. Once the SCP has determined how to process the call, it sends a message containing instructions back to the SSP. In the simplest case, these instructions would be sufficient to route the call, and the SCPs function for that call would be complete. However, for more complex services, several messages might be sent back and forth between the SCP and the SSP until the SCP has sufficient information to provide final instructions for the call.

Of the three types of offices shown in FIG. 1, only the SSP can communicate with the SCP. Thus Conventional end offices (EOs) must route AIN calls to the SSP where full AIN processing can occur.

DISCLOSURE OF THE INVENTION

With the availability of intelligent switches in the form of SSPs at COs and the availability of the STP and ISCP functionality it is possible to virtually immediately implement a new methodology which will permit the PSTN to access and supplant various alternate networks for providing end to end communication for multi-format data signals. This methodology involves adding to the dialing plan a prefix or suffix capable of defining applications and features, requesting bandwidth, or a combination of both. By the use of prefixes, the preferred methodology, radical changes to the numbering plan may be avoided. The prefix may be interpreted as part of the call set up by SS7 rather than as part of the address.

Using the intelligence of the AIN network it is possible to establish end to end connectivity of a type which permits the PSTN to become an economic link to and through existing private and semi-public networks. According to the invention the basic North American numbering plan is utilized for voice telephone calls. Where the desired communication is other than voice and is destined for a site having a directory number a prefix is added to identify the type of communication and/or the bandwidth of the channel desired. The prefix is commenced with digits or characters which trigger a non-directory number response by the network followed by digits or characters which by their position and identity constitute directory identification of the called station.

According to the invention the additional prefix digits or characters are effective to cause the end CO to effectuate the desired type of connection to the called station. Thus a called station may have a directory number, a facsimile number, an E-Mail number, etc. Under the invention methodology the message initiating party need only know the directory telephone number of the intended recipient party. The message sender also knows the type of message which is being originated, i.e., facsimile, E-Mail, etc, and thus can choose the correct prefix. The initiating party chooses the prefix corresponding to that type of message and initiates the message utilizing the telephone directory number with such prefix.

The directory number is utilized by the system to establish connection to the end office at which point the prefix controls the ultimate connection which in the case of a fax message would be to the facsimile equipment. Such connection may be effectuated by the end CO establishing a connection to the facsimile directory number of the intended recipient rather than the telephone directory number. The sending or originating party need have no knowledge of such facsimile number and the actual connection is transparent to the sender.

It is accordingly an object of the present invention to provide a methodology for effectuating end to end connectivity over the PSTN using a unique coded addressing technique which minimizes the address knowledge required of the initiating party.

It is another object of the invention to provide such a methodology and technique which facilitates more efficient and effective use of the PSTN to establish connection to and into non-PSTN networks.

It is yet another object of the invention to provide such a methodology which also permits the initiating party to efficiently and effectively designate the type and/or bandwidth of connectivity desired.

It is another object of the invention to provide in a Public Switched Telephone Network (PSTN) linking an originating facility and a terminating facility through an originating switch connected to the originating facility and a terminating switch connected to the terminating facility, where the terminating facility includes multi-format data terminal devices including a telephone terminal and an additional non-telephone data terminal where the telephone terminal and the non-telephone terminal each have an NPA-NXX-XXXX address, a method comprising the steps of (a) creating a message at the originating facility, (b) creating an address for the message comprising the NPA-NXX-XXXX address of the telephone station plus an added data set characteristic indicative of the non-telephone terminal to which the message is directed, (c) transmitting the address through the originating switch to the terminating switch, (d) analyzing the address at the terminating switch and (e) connecting the message to the data terminal characterized by the added data set.

These and other objects of the invention will become apparent upon reference to the following specification, claims and appended drawings.

DESCRIPTION OF THE PREFERRED EMBODIMENTS

The method of the invention may be implemented on the existing public switched telephone network having intelligent network capabilities and using common channel signaling such as illustrated and described in connection with FIGS. 1 and 2. Further details of such a network are set forth in AT&T 5ESS® Switched Advanced Services Platform, October 1990. The STPs and SCPs of the network are programmed to recognize prefix codes selected to designate types of messages and communication channel characteristics. An illustrative example of one embodiment of such a set of prefix codes is the following:

| | |
|---|---|
| 215-466-6600 | = Telephone call |
| 1110,215-466-6600 | = E-Mail messages at 2.4 KB |
| 1111,215-466-6600 | = Fax Messages at 2.4 KB |
| 1112,215-466-6600 | = EDI Messages |
| 1113,215-466-6600 | = Beeper Messages |
| 1114,215-466-6600 | = Deliver to a Cellular Phone or PCN |
| 1115,215-466-6600 | = TDD |
| 1120,215-466-6600 | = E-Mail Messages at 9.6 KB (including multi-media) |
| 1121,215-466-6600 | = Fax Messages at 9.6 KB |
| 1125, | = Video bandwidth connection to specified address |
| 1126, | = 9.6 KB bandwidth connection to specified address |
| 1127, | = 56 KB bandwidth connection to specified address |
| 1128, | = ISDN bandwidth connection to specified address |

Figure 3:
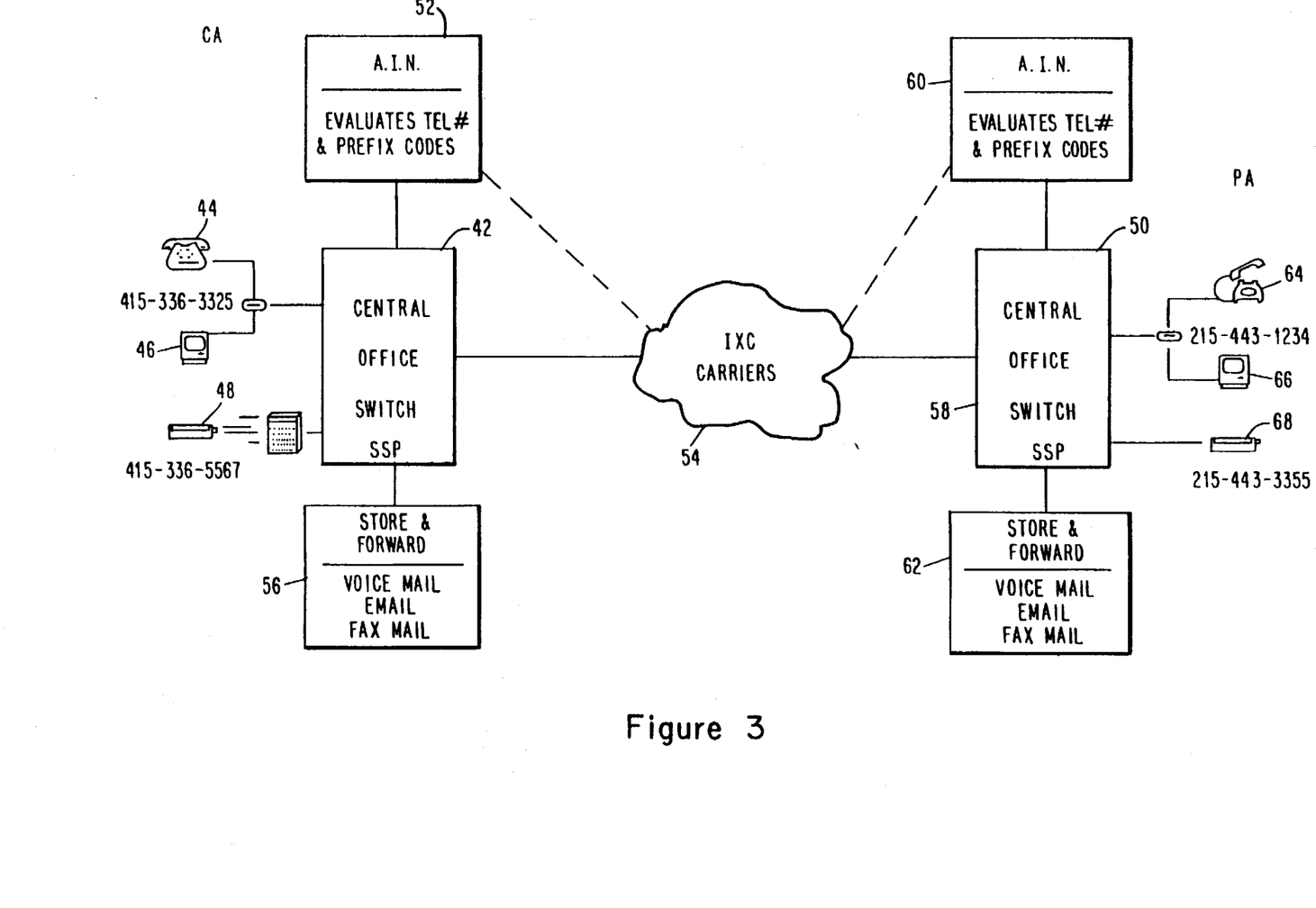
FIG. 3 is a diagrammatic illustration of a multi-network architecture in which the method of the invention may be utilized.

Referring to FIG. 3 there is shown one illustration of the operation of the method of the invention for residential delivery of a facsimile message. A central office switch 42 which is an SSP is connected to a telephone 44 and E-Mail terminal 46 which share the same line having a directory number, by way of example, 415-336-3325 (NPA-NXX-XXXX). The same terminating customer also has a facsimile terminal 48 connected to a separate line. This line may bear the exemplary directory or facsimile number 415-336-5567.

The CO/SSP 42 is connected to the AIN common channel signaling facilities of the type illustrated in FIG. 1. These are graphically illustrated in FIG. 3 at 52. The CO/SSP 42 and AIN facility 52 are connected in conventional fashion to the interexchange carrier (IXC) network which is illustrated as a cloud 54. Also connected to the CO/SSP 42 are conventional store and forward facilities for voice mail, E-Mail and fax mail as illustrated at 56. For purposes of illustration the CO/SSP 42 and related equipment may be considered to be located in California as indicated by the exemplary area code.

For purposes of illustration there is shown in FIG. 3 an East Coast CO/SSP 58 having an AIN facility 60 and store and forward facility 62. By way of example the CO/SSP and related facilities are shown as located in Pennsylvania. Thus a local loop bearing the exemplary directory number 215-443-1234 is connected to a telephone station 64 and E-Mail terminal 66. A facsimile machine 68 is connected to the CO/SSP via another local loop bearing the exemplary directory number 215-443-3355.

According to the invention a user, such as the terminating customer in California, desiring to dispatch a facsimile message to the terminating customer in Pennsylvania need only append the facsimile prefix 1111 to the directory number of the terminating customer in Pennsylvania, namely 215-443-1234. Thus the California user dials the number 1111-215-443-1234 and need not have knowledge of the distinct facsimile number of the Pennsylvania customer. Such an address will cause the SSC/STP/SCP facility to set up the necessary connections for transmitting a facsimile message at 2.4 KB. Alternatively a facsimile transmission at 9.6 KB may be established using the prefix 1121.

The prefix and directory number are forwarded via the AIN and IXC network 52, 54, 60 to the CO/SSP 58. The AIN facility 60 evaluates the directory number and prefix code and concludes that the caller desires facsimile messages to be delivered to a dedicated facsimile line with the different directory number 215-443-3355. If the terminating customer in Pennsylvania subscribes to the store and forward service the AIN facility 60 determines whether or not the facsimile directory number 215-443-3355 is busy. If so the incoming facsimile message is stored at 62 and a facsimile waiting message dispatched to the Pennsylvania customer who may retrieve the facsimile at earliest convenience. If the facsimile line 215-443-3355 is not busy the incoming facsimile message is connected by the CO/SSP 58 directly to the facsimile line 215-443-3355 and the message is delivered.

The evaluation and analysis of the directory number and prefix codes is carried out in the SCP in the AIN facility 60 at the receiving end. Thus the total intelligence of the address comprising the prefix and directory number are transmitted from the West Coast origination to the East Coast destination via the SS7 common channel signaling link as a function for which that AIN link is presently structured to handle.

Figure 4:
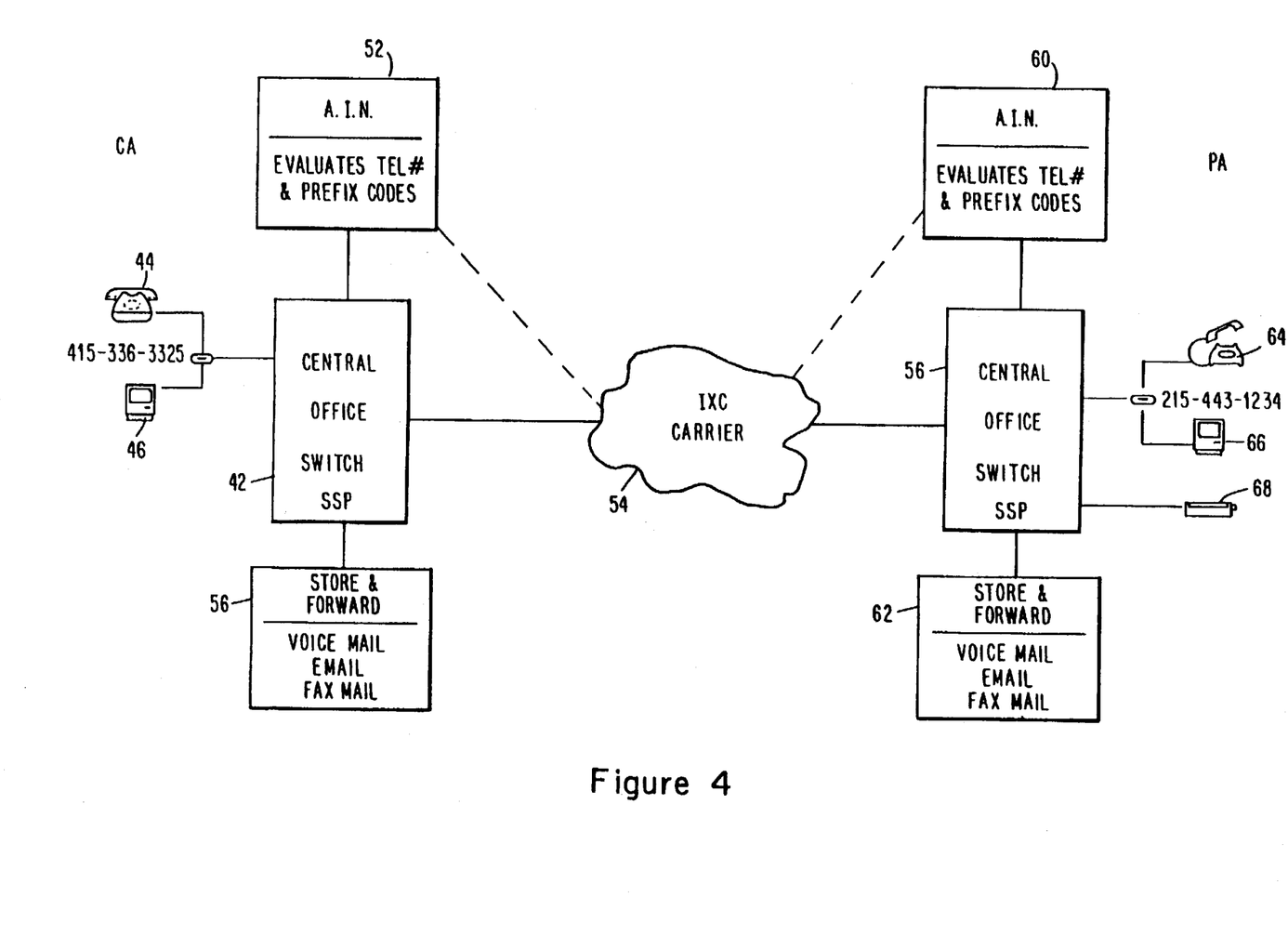
FIG. 4 is a diagrammatic illustration of another illustration of a multi-network architecture in which the method of the invention may be utilized.

Referring to FIG. 4 there is shown an illustration of a residential E-Mail delivery. Viewing that figure there is seen the same network disposed between the West Coast originating directory number 415-336-3325 and the East Coast terminating number 215-443-1234. In this example the CO/SSP 42 is connected to the same telephone station 44 and E-Mail terminal 46. The East Coast terminating customer has connected to the line 215-443-1234 the telephone station 64 and E-Mail terminal 66.

To effectuate this service the E-Mail user in California creates a message to send to the Pennsylvania customer. The California user originates the prefix code and telephone number for 2.4 KB E-Mail, namely 1110-215-443-1234. The terminating CO/SSP 58 and its related AIN facility 60 evaluate the prefix and directory number and evaluate the options created by the service to which the destination customer subscribes. In this instance the Pennsylvania customer desires E-Mail message stored under busy or no answer conditions with a message alert. The AIN facility 60 therefore determines whether the busy/no answer condition exists and if not, immediately directs the appropriate connection and delivery of the E-Mail message. If the busy/no answer condition does exist, the AIN facility directs connection to and storage of the E-Mail message in the store and forward facility 62 with appropriate notification to the Pennsylvania customer at the directory number 215-443-1234. As in the preceding example, the entire directory number and handling prefix intelligence is conveyed from origination in California to termination in Pennsylvania where the terminating SCP and associated STP effect the appropriate connection and action.

Figure 5:
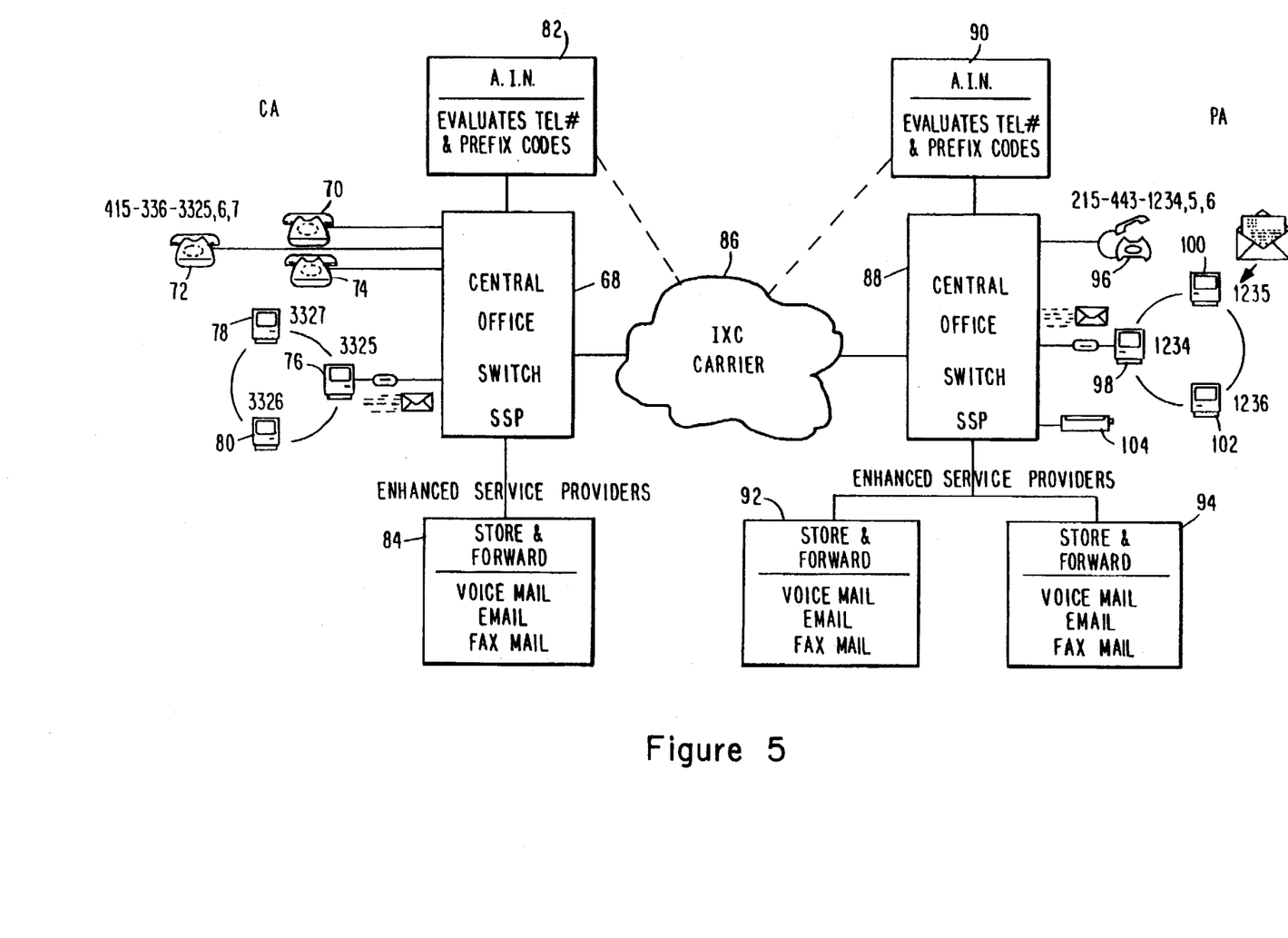
FIG. 5 is a diagrammatic illustration of another illustration of a multi-network architecture in which the method of the invention may be utilized.

Referring to FIG. 5 there is shown an example of the invention applied to delivery of messages to a LAN based E-Mail system. Referring to that figure there are seen three directory number lines connected to telephone stations 70, 72 and 74 and to E-Mail terminals 76, 78 and 80. By way of example, these lines may bear the directory numbers 415-336-3325, 6, 7. The CO/SSP 68 is provided with an AIN facility 82 and may be connected to an enhanced service provider at 84 providing store and forward service for voice mail, E-Mail and fax mail.

The CO/SSP 68 and AIN facility 82 are connected via the IXC network 86 to a terminating CO/SSP 88 and AIN facility 90. As illustrated, the CO/SSP 88 may be connected to one or more enhanced service providers such as illustrated at 92 and 94. In the example such providers offer store and forward service for voice mail, E-Mail and fax mail. Connected to the CO/SSP 88 is a three line telephone terminal 96, an E-Mail LAN network having terminals 98, 100 and 102 served by directory numbers 215-443-1234, 5, 6, and a shared facsimile terminal 104. As will be understood, the E-Mail terminals may comprise conventional PCs.

In this architecture the originating customer in California creates an E-Mail message for the terminating customer in Pennsylvania with the prefix and telephone number 1110-215-443-1235. This address is communicated to the Pennsylvania termination where the AIN facility examines the prefix and sends the message directly to the LAN system. The LAN system routes the message to the appropriate mailbox based on the telephone number. If the LAN is busy or not available, the message may be stored in the store and forward facilities and a message alert sent. The same procedure is applicable for delivery to the facsimile machine but in this instance a different prefix code is utilized, i.e., 1111-215-443-1234, 5 or 6.

Figure 6:
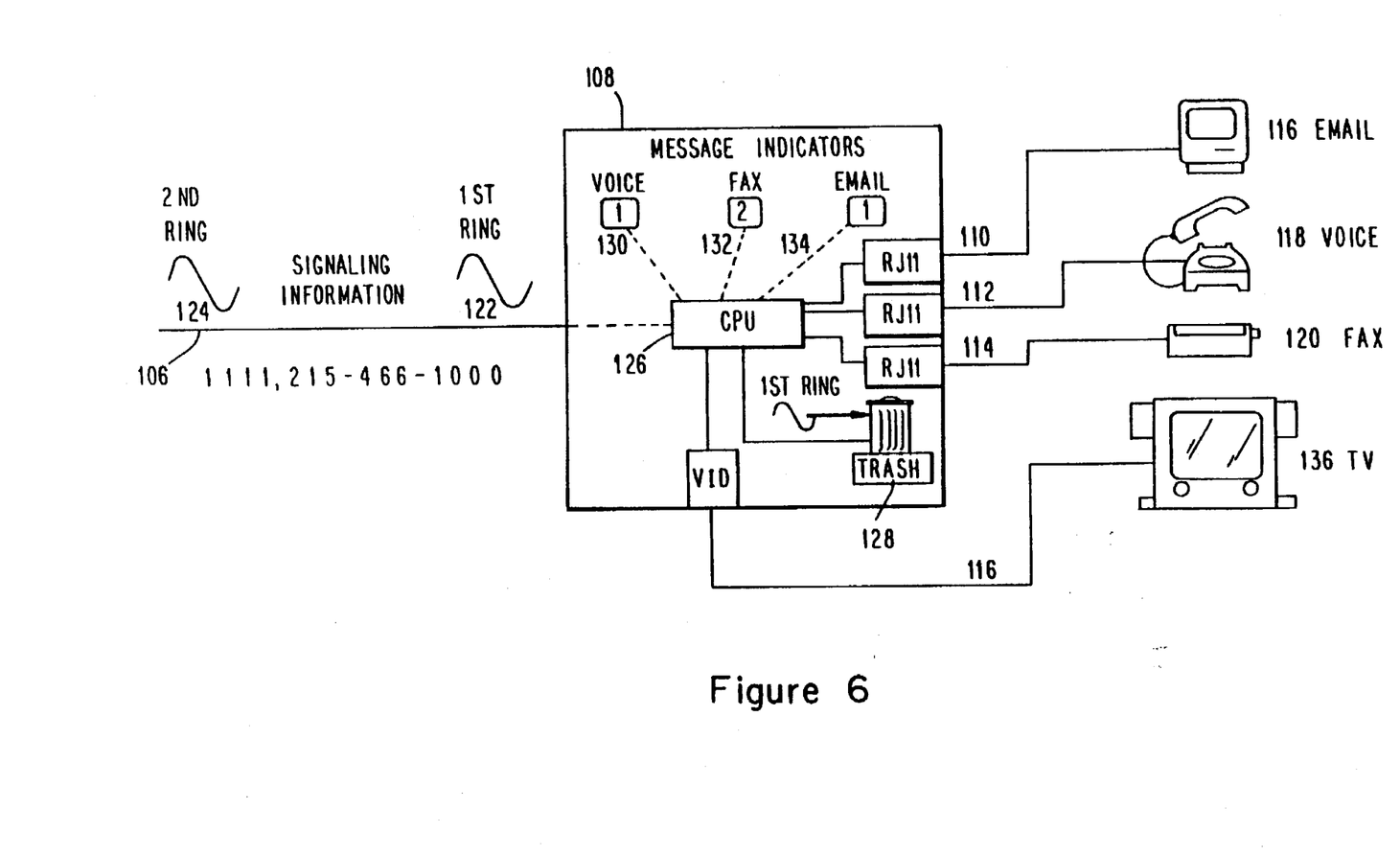
FIG. 6 is a diagrammatic illustration of another embodiment of the invention utilizing consumer premise switching equipment.

In the examples of the invention described in connection with FIGS. 3, 4 and 5 the complete address intelligence including the prefix is transmitted from the originating CO/SSP/AIN facility to the terminating CO/SSP/AIN facility. At that terminating facility the prefix is utilized to select and effectuate the directed action. Referring to FIG. 6 there is shown a further embodiment of the invention wherein this complete address intelligence is passed through and beyond the terminating CO/SSP/AIN to the customer premise.

In the embodiment illustrated in FIG. 6 a customer line 106 bearing directory number 215-466-1000 connects from the terminating CO/SSP (not shown in FIG. 6) to the customer premise. At the customer premise the line 106 is connected to a processor or adjunct device 108 which is itself connected via RJ11 jacks 110, 112, 114 to an E-Mail terminal 116, telephone station terminal 118 and facsimile terminal 120 and through a video connector to a television set 136 for reproducing or transmitting TV signals. The processor or adjunct 108 may be a PBX or simply a CPE adjunct which performs the function which is performed by the AIN facility in the examples illustrated in FIG. 3, 4 and 5. The processor or adjunct 108 is provided with message indicator lights or other indicators 130, 132, 134 for indicating voice, facsimile or E-Mail messages respectively.

The processor 108 receives the ringing signal illustrated as a first ring 122 and second ring signal 124 which has superimposed between ring signals the signaling information represented by the directory number plus the prefix or, as shown in FIG. 6, 1111-215-466-1000. According to this embodiment of the invention the processor or adjunct 108 is provided with a signaling information reader 126 which separates the first ring signal 122 for direction to a conventional first ring absorber 128 whereby the first ring signal is removed from the incoming intelligence. The reader 126, which may comprise a suitable microprocessor, evaluates the signaling information and determines the next steps, i.e., (1) route to telephone and ring, (2) route to facsimile device, (3) route to mailbox or (4) sent to store and send message alert signal.

The first ring absorption prevents the customer from inadvertently picking up the telephone at the first ring and thereby destroying the signaling information. The ring absorption also avoids disturbance to the customer when no action is necessary. Thus the telephone does not ring on the first ring signal but rather the first ring initiates a lock out procedure which closes down the terminal devices from being activated by the first ring signal and thereby destroying the signal during its arrival. The second ring signal thereby becomes the first ring in terms of appearance to the telephone terminal if the telephone terminal is the intended destination.

The microprocessor 126 is so programmed as to read the prefix code and connect the incoming message to the appropriate terminal. In the event that this constitutes the facsimile machine 120 the incoming message is connected to the facsimile machine and no ringing signals reach the telephone station 118 and no ringing signals are audible at the terminating customer site. The same occurs in the case of an E-Mail message destined for the E-Mail terminal 116. The prefix simultaneously actuates the message indicators 130, 132 and 134 so as to advise as to the type message being received and as to the fact that such message is in the process of being received or is stored. The function of the processor or adjunct 108 may obviously be served by a microprocessor in the form of a PC with suitable software.

It will be appreciated from the foregoing that there is provided according to the invention a methodology for utilizing available AIN technology in the form of SSPs, STPs and ISCPs to permit the public switched telephone network to provide end to end communication for multi-format signals in an improved manner. By the use of destination or application directing prefixes it is feasible to provide economic end to end connectivity which permits the PSTN to become an economic link to and through existing private and semi-public networks. The basic North American numbering plan is utilized so as to require minimal change in existing operating procedures. The methodology provides a unique coded addressing technique which minimizes the address knowledge which must be possessed by the initiating party. While the coding has been specifically described utilizing prefix coding, it is also possible and within the scope of the invention to utilize suffixes.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. In a communications system comprising local communication lines, a services control point comprising a database for storing call processing data, a plurality of interconnected central office switching systems each connecting to a plurality of said local communication lines and responding to a service request on a connected local communication line to selectively provide a communication connection for a requesting line, and a signaling communication system interconnecting the central office switching systems and connecting the central office switching systems to the services control point, a method of completing a call comprising the steps of:

receiving at an originating one of the central office switching systems via the requesting line an address for a message to be transmitted to a called party having a data terminal and a telephone, the address and message being generated at an originating facility and the address comprising an NPA-XXX-XXXX address of the called party and an added data set, said added data set being characteristic of a format of the message to be transmitted;

transmitting the address from the originating central office switching system to a destination central office switching system serving the called party via the signaling communication system;

outputting to the services control point via the signaling communications systems a query message from the destination central office switching system in response to the received address, the query message including said NPA-XXX-XXXX address and said added data set;

accessing call processing data corresponding to the called party from the database of said services control point to formulate a connecting message in response to said added data set;

sending a connecting message, generated in response to the accessing step, from the services control point to said destination central office switching system; and selectively establishing a communication link to a device other than said telephone for the requesting line through said destination central office switching system, in response to said connecting message, to enable the communication of said message to be transmitted.

2. The method of claim 1, wherein said added data set identifies a bandwidth of said message, the communication link establishing step comprising the step of connecting the requesting line to a local communication line serving the destination facility and adapted to accommodate the bandwidth of said message.

3. The method of claim 1, wherein the link establishing step comprises the step of connecting the requesting line to a second NPA-XXX-XXXX accessible by said data terminal.

4. The method of claim 2, wherein said message is an E-mail message and said called party has access to a first local communication line and includes a plurality of said data terminals forming a local area network.

5. The method of claim 4, further comprising the steps of:
   providing first and second ring signals on the first local communication line; and
   providing signaling information including said added data set on the first local communication line between said first and second rings.

6. The method of claim 5, further comprising the step of at the called party, selectively routing the message to one of said data terminals in response to said signaling information.

7. The method of claim 1, further comprising the steps of:
   connecting the requesting line to a first local communication line serving the called party;
   providing first and second ring signals on the first local communication line; and
   providing signaling information including said added data set on the first local communication line between said first and second rings to enable the communication of said message to said device.

8. The method of claim 7, wherein said first local communication line has a second NPA-XXX-XXXX address.

9. The method of claim 1, wherein said device is a store and forward facility, the selectively connecting step comprising connecting the requesting line to the store and forward facility for storage of said message.

10. The method of claim 9, further comprising generating a notification message for the called party corresponding to said NPA-XXX-XXXX address of the storage of said message.

11. The method of claim 1, wherein said device is said data terminal.

* * * * *